United States Patent [19]
Watson

[11] 3,893,009
[45] July 1, 1975

[54] REVERSE POWER FLOW RELAY

[75] Inventor: John D. Watson, Bognor Regis, England

[73] Assignee: Westinghouse Electric Corp., Pittsburgh, Pa.

[22] Filed: Jan. 16, 1974

[21] Appl. No.: 433,957

[52] U.S. Cl. .................. 317/43; 317/27 R; 317/39; 307/127; 324/83 A
[51] Int. Cl. .................. H02h 3/26; H02h 3/38
[58] Field of Search ............ 317/9 PF, 23, 27 R, 39, 317/43, 47, 51, 33 R; 324/83 R, 83 A, 83 D, 83 FE; 328/110, 133; 307/232, 236, 127; 340/253 Y

[56] References Cited
UNITED STATES PATENTS

| | | | |
|---|---|---|---|
| 3,495,096 | 2/1970 | Blachowicz et al. | 328/133 |
| 3,518,491 | 6/1970 | Downs | 317/43 |
| 3,539,868 | 11/1970 | Stevenson | 317/43 |
| 3,575,616 | 4/1971 | Jordan | 328/133 |
| 3,579,043 | 5/1971 | Goeller | 317/43 |
| 3,700,919 | 10/1972 | Stich | 317/43 |

Primary Examiner—J. D. Miller
Assistant Examiner—Patrick R. Salce
Attorney, Agent, or Firm—J. L. Stoughton

[57] ABSTRACT

A reverse alternating potential power flow relay which compares the phase of the current and voltage of the alternating potential power at a predetermined degree period in the wave of one of the current and voltage and which is effective when the relative phase of the current and voltages is indicative of a reverse direction of power flow.

10 Claims, 2 Drawing Figures

3,893,009

REVERSE POWER FLOW RELAY

BACKGROUND OF THE INVENTION

This invention generally relates to a reverse flow power relay which will sense small power flow in a direction opposite from the normal load power and is particularly useful in connection with network protectors in which the normal flow of power to the load is not controlled but which will in the event of a small power flow in the opposite direction as for example the magnetizing power required by the usual step-down transfer which reduces the potential of the supplied power to that required by the load supplying network.

Network protectors are known in the prior art as for example the apparatus shown and described in U.S. Pat. 3,248,609 to J. C. Gambale dated Apr. 26, 1966. In that patent, the discriminator network compares the magnitudes and phase of two single phase alternating quantities which represent the positive sequence current and positive sequences voltage flowing into the network. These voltages are combined as $(E_F + E_I) - (E_F - E_I) = E_o$, where $E_F$ is the voltage quantity representing the positive sequence voltage, $E_I$ is the voltage quantity representing the positive sequence current of the feeder circuit, and $E_o$ is the output voltage which changes in polarity depending on the direction of power flow in the feeder circuit. In other words, the magnitudes of the quantities are utilized as well as their relative phases.

It is known in the field of distance relaying in which the relay measures the line impedance to the fault location to measure the difference in magnitudes and phase of a first quantity representing line voltage and a second quantity representing line current by measuring the magnitudes and phase at a predetermined degree instant in the alternating voltage wave. Such a distance relay is shown and described in U.S. Pat. No. Re. 23,430 to A. R. Van C. Warrington dated Nov. 20, 1951.

SUMMARY OF THE INVENTION

In accordance with the present invention the phase of the quantities which represent the current and voltage in the power line is compared without reference to the relative magnitudes of these quantities. One quantity (illustrated as being the voltage related quantity) is utilized to select the instant at which the polarity of the other quantity (illustrated as being the current related quantity) is determined. The invention is illustrated in connection with network protector relaying and has especial utility in connection therewith. Such network protecting relays are required to detect and provide a tripping signal in response to a flow of power outwardly from the network in amounts as small as the energizing power of the transformer which steps down the transmission line voltage to the network voltage and yet not be deleteriously effected by the flow of large amounts of power into the network. The invention however has a more general use and may be used in any circuit in which a reversal of the power flow is to be detected.

DETAILED DESCRIPTION

Figure 1:
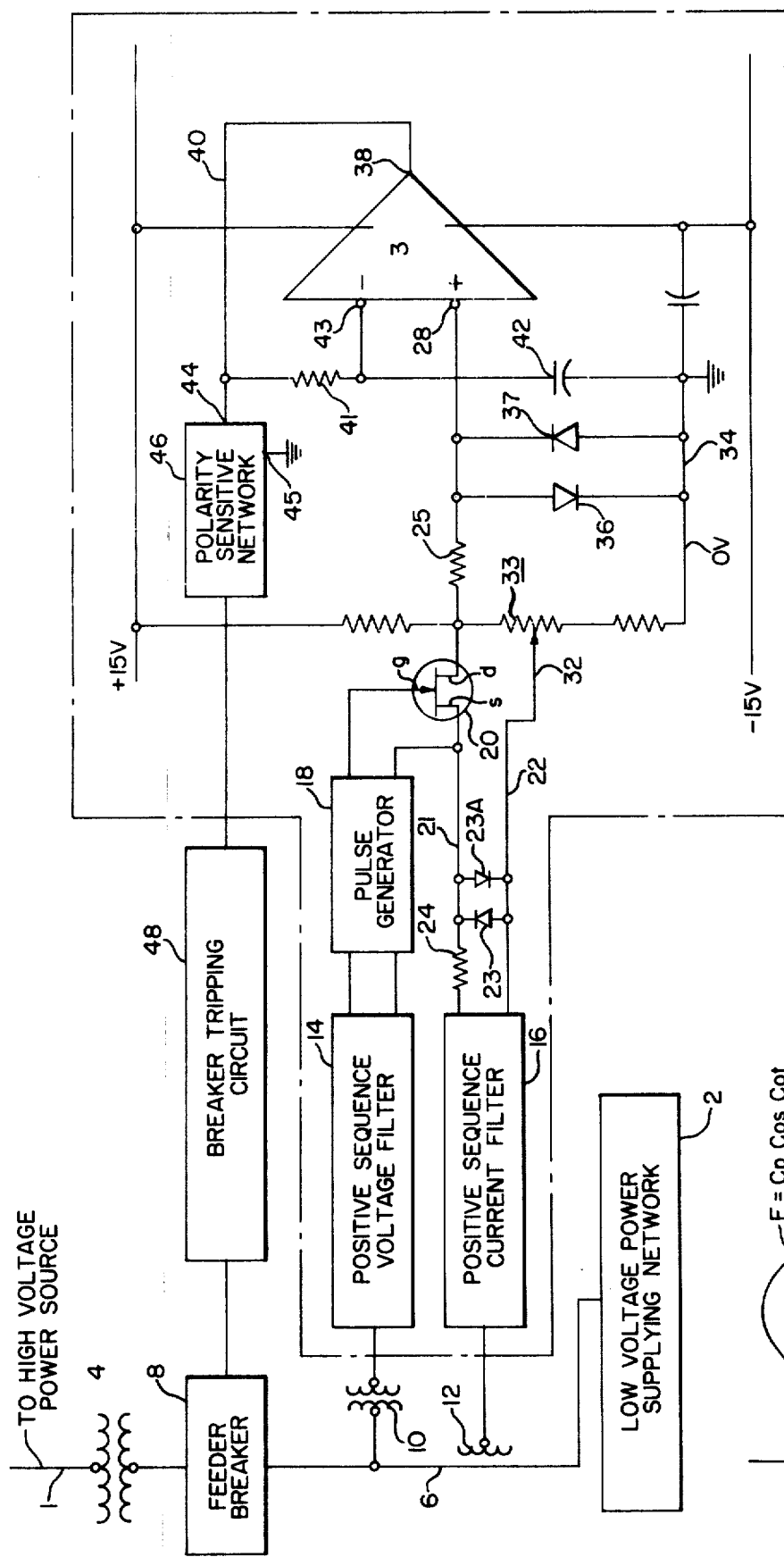
FIG. 1 is a schematic representation of a network protector embodying the invention; and, FIG. 2 illustrates alternating wave forms useful in understanding the invention.

Referring to the drawings by characters of reference, the numeral 1 designates a portion of a three phase power transmission line having a voltage greater than that of a three phase low voltage power supplying network 2. The line 1 is connected to the network 2 through a step down voltage transformer 4, a feeder circuit 6 and a feeder circuit breaker 8. The network 2 is conventional and is energized through other feeder circuits (not shown) so that should the transmission line 1 be deenergized as for example servicing of equipment connected thereto, the feeder breaker 8 must disconnect the feeder circuit 6 from the transformer 4 to prevent energization of the line 1 from the network 2. For this purpose first and second alternating quantities which are proportional in magnitude and phase of the voltage of and of the current flowing in each of the phase conductors which comprise the feeder circuit 6. These quantities are derived in the usual manner by the use of the usual voltage and current transformer arrays 10 and 12 to the positive sequence voltage and current filters 14 and 16. The output of the filters 14 and 16 are single phase alternating voltage quantities $E_F$ and $E_I$ which represent the positive sequence voltage at and the positive sequence current flowing through the feeder circuit 6.

The alternating quantity $E_F$ is supplied from the filter 14 to a pulse generator 18. The pulse generator 18 may take any desired form in which it will produce a short duration sampling pulse at a desired degree interval in the wave of the alternating quantity $E_F$. The duration of the pulse may approximate 50 microseconds which in the case of a 60 Hz wave will approximate 1 degree. This pulse is applied to a suitable switching device such as between the gate g and source s of a gate controlled field effect transistor 20.

The alternating quantity $E_I$ is supplied from the filter 16 to the conductors 21 and 22 through a voltage dropping resistor 24. A pair of anti-parallelly arranged diodes 23 and 23A are connected between the busses or conductors 21 and 22 to limit the magnitude of the voltage which may appear between the busses 21 and 22.

The bus 21 is connected through the main circuit [source $(s)$ — drain $(d)$] of the transistor 20 and a second voltage dropping resistor 25 and a bus 26 to the + terminal 28 of a high gain operational amplifier 30. The bus 22 is connected to the movable arm 32 of a voltage dividing network 33 and therethrough to a zero voltage ground bus 34. A second pair of anti-parallelly arranged diodes 36 and 37 are connected between the busses 26 and 34 to limit the voltage excursions at the input of the amplifier 30.

The output terminal 38 of the operational amplifier is connected by a bus 40 through a feedback network comprising a resistor 41 and a capacitor 42 to the bus 34. The common terminal of the resistor 41 and capacitor 42 is connected to the — terminal 43 of the amplifier. The time constant of the resistor-capacitor network is selected to be large as compared to the duration of the sampling pulse provided by the pulse generator 18 so that the charge on the capacitor 42 will not change appreciable during the sampling interval during which transistor 20 conducts to supply the quantity $E_I$ (as it may be modified by the voltage dropping resistors 24 and 25 and by the bias if any providing by the dividing network 32) between the input terminal 28 and bus 34. This causes the amplifier output terminal 38 to assume a potential equal to the input voltage times the amplifier gain and of a magnitude above or below the normal output voltage, depending on the polarity of the sample supplied to the amplifier 38, for the duration of the sampling pulse.

The output voltage of the amplifier 30 is applied between the input terminals 44 and 45 of a polarity sensitive network 46. This network can take many forms such as a sample-and-hold network, a flip-flop or other convenient device which will provide an output signal solely when the polarity of the output voltage pulse of the amplifier 38 changes in polarity to indicate that the power flow has reversed and power is flowing from the network into the feeder circuit 6. When this occurs the output signal of the network 46 actuates the breaker tripping circuit 48 to trip the feeder breaker 8.

Figure 2:
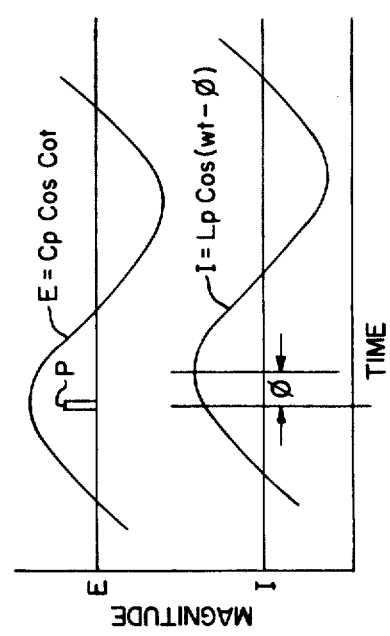

Referring to FIG. 2, wherein the curve E illustrates the waveform of the quantity $E_F$ and the curve I illustrates the waveform of the quantity $E_I$ and the curve P indicates the output pulse of the pulse generator 18, it will be seen that for all leading and lagging power factors of the current I the polarity of the sample supplied to the amplifier will be of a given polarity. By the proper phasing of the quantities $E_F$ and $E_I$, the sample can be made positive when power flows through the feeder circuit 6 toward the network 2. Should the power flow through the circuit 6 outwardly of the network 2 the phase of the curve will be 180 degrees displaced from the illustrated curve and therefore at the time the sample is taken it will be of negative polarity and the output voltage pulse of the amplifier 30 will reverse in polarity and become negative with respect to the normal output voltage thereof.

It will now be appreciated that numerous modifications may be made. For example, a switching device 20 which conducts only in the direction of energization which reflects the undesired power flow in the monitored circuit could be used. Also if desired the output of amplifier 30 could be used to energize a polarity sensitive network which will provide a first output when the output voltage pulses of the amplifier are of one polarity to indicate power flow in the first direction and will provide a second output when the output voltage pulses of the amplifier are of the opposite polarity to indicate power flow in the opposite direction. If the monitored circuit is single phase, the filters 14 and 16 could be omitted. Furthermore, if no threshold of reverse power flow is desired the voltage dividing network 33 could be omitted. While the preferred embodiment contemplates the pulse P to be at the 90° point in the wave E, this pulse could appear at other degree points, however, if the power factor angle of the power flow through the monitored circuit should become extreme, false operations could occur.

What is claimed and is desired to be secured by United States Letters Patent is as follows:

1. A power flow direction relay for a power transmitting circuit, said relay comprising: first and second input circuits and an output circuit, said input circuits being energized with first and second alternating quantities representative of the current and voltage in said power circuit, a first switching device having a main circuit and a control circuit for initiating a change in the conductive condition of said main circuit, a pulse generator, first circuit means connecting one of said input circuits to said control circuit of said switching device and including said pulse generator, second circuit means connecting the other of said input circuits to said output circuit and including said main circuit of said switching device, said pulse generator being effective to actuate said control circuit to initiate a change in the conductive condition of said main circuit solely during a predetermined time interval in degrees of the one alternating quantity which energizes said one input circuit, said output circuit including a high gain amplifier and a feedback circuit, said feedback circuit including a timing network, said timing network comprising a primarily reactive device and a primarily resistive device, said timing network having a time constant substantially greater than said predetermined time interval, said second circuit means connecting said other input circuit through said main circuit of said switching device to the input of said amplifier.

2. The relay of claim 1 in which said pulse generator renders said control circuit effective to render said main circuit conductive during said predetermined interval.

3. The relay of claim 2 in which said main circuit of said switching device conducts bi-directionally, said output circuit including a polarity sensitive device which is actuated to transmit an output signal solely when the conduction through said switching device is in a first direction.

4. The relay of claim 3 in which said amplifier comprises a operational amplifier having a negative input terminal and a positive input terminal and an output terminal and first and second energy supplying terminals, a unidirectional power supply having a positive terminal and a negative terminal and a third terminal, said power supply being effective to maintain the potential of said third terminal intermediate that of said positive and negative terminals, said primarily reactive device being connected between one of said input terminals of said operational amplifier and said third terminal, said primarily resistive device being connected between said output terminal of said amplifier and a desired terminal of said input terminals of said operational amplifier, said second circuit means connecting said other input circuit through said main circuit of said switching device between a selected terminal of said input terminals and said third terminal of said power supply, and means connecting said positive and negative terminals of said power supply to said energy supplying terminals of said operational amplifier.

5. The relay of claim 4 in which said desired terminal and said one input terminal are said negative input terminal of said operational amplifier and said selected terminal is said positive input terminal of said operational amplifier.

6. In combination, a power transmitting circuit having an input for energization from a source of alternating potential energy and an output for energizing an energy consuming load, a pulse generator having an input connected to said power circuit and energized with a first alternating quantity having a predetermined phase relation with respect to the phase of one of the alternating potential and current of said power, a solid state switching device having a main circuit and a control circuit which controls the conductive condition of said main circuit, said generator having an output connected to said control circuit and effective to place said control circuit in condition to render said main circuit conducting solely at a predetermined degree time in the wave of said first alternating quantity and solely for a predetermined number of degrees of said first alternating quantity, a polarity sensitive network having an input connected to said power circuit through said main circuit of said solid state device and energized with a second alternating quantity having a predetermined phase relation with respect to the phase of the other one of the alternating potential and current of said power, said polarity sensitive network having an output energized solely when said second alternating quantity which is supplied to said input of said polarity sensitive network is at a first polarity, said first polarity of said second quantity being indicative of a flow of power in said power circuit from its said output to its said input, said power transmitting circuit including a circuit interrupting device controlling the connection thereof to said load, said output of said polarity sensitive network being operatively connected to said disconnecting device, said polarity sensitive network being effective when its said output is energized to cause said circuit device to disconnect said power transmitting device from said load, said polarity sensitive network including an operational amplifier having a pair of input terminals and an output terminal which changes in potential with respect to ground as a function of the polarity of the potential which is applied between a first of said pair of input terminals and ground, a capacitor connected between ground and a second of said pair of input terminals, a resistor connected between said second input terminal and said output terminal of said amplifier, said input of said polarity sensitive network being operatively connected between said first input terminal of said amplifier and ground, said output of said polarity sensitive network being operatively connected between said output terminal of said amplifier.

7. The combination of claim 6 in which means is provided to limit the magnitude of said second quantity.

8. The combination of claim 6 in which means is provided to limit the magnitude of said second quantity which is supplied to said switching device.

9. The combination of claim 6 in which means is provided intermediate said input of said polarity sensitive network and said switching device to limit the magnitude of said second quantity which is supplied to said input of said polarity sensitive network.

10. The combination of claim 8 in which means is provided intermediate said input of said polarity sensitive network and said switching device to limit the magnitude of said second quantity which is supplied to said input of said polarity sensitive network.

* * * * *